United States Patent [19]

Bernhard

[11] Patent Number: 4,509,988

[45] Date of Patent: Apr. 9, 1985

[54] NACREOUS PIGMENTS HAVING IMPROVED LIGHT FASTNESS, THEIR PREPARATION AND USE

[75] Inventor: Horst Bernhard, Schwarzenberg, Austria

[73] Assignee: Merck Patent Gesellschaft mit beschräkter Haftung, Darmstadt, Fed. Rep. of Germany

[21] Appl. No.: 453,044

[22] Filed: Dec. 27, 1982

[30] Foreign Application Priority Data

Dec. 24, 1981 [DE] Fed. Rep. of Germany ....... 3151355

[51] Int. Cl.$^3$ ..................... B32B 19/02; C04B 31/26; C09C 1/00; C09C 3/06
[52] U.S. Cl. ............................ 106/308 R; 106/308 B; 106/308 Q; 106/291; 427/215; 428/363; 428/404
[58] Field of Search ..................... 106/291, 308 B, 309, 106/DIG. 3, 308 Q, 308 R; 427/214, 218, 219, 215; 428/363, 404

[56] References Cited

U.S. PATENT DOCUMENTS

| | | | |
|---|---|---|---|
| 3,087,828 | 4/1963 | Linton | 106/291 |
| 3,087,829 | 4/1963 | Linton . | |
| 3,342,617 | 9/1967 | Jackson . | |
| 3,650,790 | 3/1972 | Klenke et al. . | |
| 3,711,308 | 1/1973 | Brand et al. | 106/291 |
| 3,832,208 | 7/1974 | Jackson . | |
| 3,926,659 | 12/1975 | Bernhard et al. . | |
| 4,134,776 | 1/1979 | Rieger et al. . | |

Primary Examiner—Howard S. Williams
Attorney, Agent, or Firm—Millen & White

[57] ABSTRACT

Nacreous pigments having improved light fastness are based on mica flakes coated with metal oxides, wherein the metal oxide layer is formed as a homogeneous mixed layer in which, in addition to titanium dioxide, silicon dioxide and iron oxide are also present. To produce these pigments, mica is coated in an aqueous suspension by coprecipitation of a titanium dioxide hydrate, iron hydroxide and silicon dioxide to form a uniform layer. The flakes are then washed, dried and calcined.

The pigments can be used for the pigmenting of plastics, lacquers, paints and toiletries.

15 Claims, No Drawings

NACREOUS PIGMENTS HAVING IMPROVED LIGHT FASTNESS, THEIR PREPARATION AND USE

BACKGROUND OF THE INVENTION

The present invention relates to nacreous pigments having improved light fastness and which are based on mica flakes coated with metal oxides.

A basic requirement for these pigments, in particular as regards their outdoors use, is an adequate light and weathering fastness. A number of processes have already been proposed which are intended to improve the light fastness of such mica flakes which are usually coated with $TiO_2$. Thus, German Offenlegungsschrift No. 2,106,613 proposes an additional treatment of the pigments with silicate after the actual coating of the mica with $TiO_2$. In German Offenlegungsschrift No. 2,215,191 and German Offenlegungsschrift No. 2,852,585 external coatings of methacrylatochromium-(III) chloride or of chromium hydroxide respectively are applied to obtain stability to light.

Nevertheless, there still exists a need for pigments which, on the one hand, have very good light fastness and, on the other hand, are also simpler to prepare than known pigments, which usually require an additional process step to achieve stability to light.

SUMMARY OF THE INVENTION

Accordingly, it is an object of this invention to provide pigments which satisfy these needs.

Upon further study of the specification and appended claims, further objects and advantages of this invention will become apparent to those skilled in the art.

It has now been found that, surprisingly, pigments with strong color and, in particular, also high light-resistance are obtained when iron hydroxide and silicon dioxide are precipitated simultaneously with the titanium hydroxide, so that a mixed layer is formed in which, after conventional calcination, $TiO_2$, $Fe_2O_3$ and $SiO_2$ are present side by side in homogeneous distribution. It has been found that the addition of $Fe_2O_3$ alone or of $SiO_2$ alone does not produce results as excellent as those of the combination of $SiO_2$ and $Fe_2O_3$.

These objects have thus been achieved by this invention by providing nacreous pigments having improved light fastness and which are based on mica flakes coated with metal oxides, wherein the metal oxide layer is formed as a homogeneous mixed layer which, in addition to titanium dioxide, comprises silicon dioxide and iron oxide.

The present invention also relates to a process for preparing these pigments and to their use.

DETAILED DISCUSSION

A further advantage of the pigments according to this invention, in addition to their very high light fastness, is their very simple preparation. While the preparation of light-stabilized pigments in accordance with the state of the art generally requires an additional coating with a protective agent after the coating step with titanium dioxide, the pigments according to this invention can be coated in a onestage process.

This preparation method is based on known processes for preparing nacreous pigments, in particular, e.g., on the process described in German Pat. No. 2,009,566, which disclosure is incorporated by reference herein. All of the details of the process of this invention are in accordance with this disclosure unless indicated otherwise herein. In this process, mica flakes which, as a rule, have a diameter of about 5–200 μm and a thickness of about 0.1–5 μm are suspended in an aqueous solution adjusted to a pH value of about 0.5–5, in particular about 1.5–2.5, by means of a suitable acid, such as, for example, hydrochloric acid or sulfuric acid. A titanium salt solution is then allowed to flow slowly into the hot suspension at about 50°–100° C., preferably about 70°–80° C. The pH of the suspension is maintained essentially at a constant value within the mentioned range by the simultaneous addition of a base. The process according to this invention preferably uses $TiCl_4$ solutions containing about 1–40 percent by weight, preferably about 5–30 percent by weight of $TiCl_4$. However, in contrast to the process described in German Pat. No. 2,009,566, the $TiCl_4$ solution additionally also contains an iron salt. For this purpose, $FeCl_3$ is preferably used, in an amount of 0.02–30 percent by weight, preferably about 0.2–25 percent by weight. However, it is possible to employ other compatible, soluble titanium and/or iron salts.

To maintain the pH value of the mica suspension, an alkali metal hydroxide solution, in particular NaOH, is preferably used. This solution also contains the $SiO_2$, as a soluble alkali metal silicate, to be co-precipitated with titanium hydroxide and iron hydroxide. This solution contains as a rule about 1–40 percent by weight, preferably about 5–35 percent by weight, of NaOH and about 0.01–10 percent by weight, preferably about 0.1–8 percent by weight, of silicate, calculated as $SiO_2$.

Precise amounts of all ingredients for given systems can be readily determined using the usual conventional considerations, perhaps with a few routine orientation experiments.

The two solutions are slowly added in such a way that the hydroxides or hydrated oxides formed by hydrolysis in the mica suspension in each case precipitate completely onto the mica surface without significant amounts of by-product being freely mobile in the suspension. The rates of addition used in this step are so chosen that, per minute and per square meter of surface area to be covered, about 0.01 to $20 \times 10^{-5}$ mole of salts to be precipitated are added. Depending on the desired thickness of the coating, the process requires coating times of several hours up to several days, precise times also being routinely determinable using fully conventional considerations.

The coating solutions, if appropriate, can also contain additional additives. Thus, for example, it has been found to be advantageous to add $AlCl_3$ to the $TiCl_4$- and $FeCl_3$-containing solution. This additive co-precipitates in the coating step as $Al(OH)_3$. $AlCl_3$ is generally used in an amount of about 0.1–15 percent by weight, preferably about 0.2–10 percent by weight of the solution.

Iron salts are used in an amount such that, in the metal oxide layer, an iron content, calculated as $Fe_2O_3$, of about 0.1–60 percent by weight, preferably of about 1–30 percent by weight, and in particular of about 2–20 percent by weight is formed. Silicates and aluminum salts are metered in such a way that, in the metal oxides layer, in each case, a content of 0.1–20, preferably of about 1–10, percent by weight, calculated as $SiO_2$ and $Al_2O_3$, is produced. $Fe_2O_3$ and $SiO_2$ jointly represent about 0.2–70, preferably 2–40, and in particular 5–30, percent by weight of the metal oxide layer.

After the desired layer thickness or interference color has been reached, the coating step is terminated. The pigments, analogously to customary processes, are separated off, washed, dried and calcined. The temperatures used for the calcination are about 500°–1,000° C., in particular 700°–1,000° C., and the metal hydroxides, or the hydrated oxides, are dehydrated and turn into the corresponding oxides.

Any interference color, of first or also higher order, can be obtained by varying the thickness of the coating. The co-precipitated $Fe_2O_3$, depending on the amount of iron salt used, additionally imparts to the pigment a more or less pronounced inherent color. This reddish brown inherent color, in particular together with a yellow interference color, produces very attractive intensive golden shades, which, within the scope of the present invention, are therefore particularly preferred.

Pigments obtained according to this invention have a markedly improved light fastness, so that the invention provides valuable new pigments. The pigments of this invention can be used fully analogously to the manner of use of existing pigments, namely, for example, for pigmenting plastics, paints or lacquers, but in particular also in toiletries and cosmetics. Because of their improved light fastness, any applications in which the pigments are exposed to a pronounced degree to environmental influences, in particular, for example, in car paints, are also preferred since they take particular advantage of the improved properties of the pigments of this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A suspension of 45 g of potassium mica having a platelet size between 10 and 70 μm in 1.5 l of water is adjusted to a pH value of 2.2 by adding a 10 percent $TiCl_4$ solution and is heated to 75° C. Both a solution containing 10 percent by weight of $TiCl_4$ and 1.4 percent by weight of $FeCl_3$ and a solution containing 10 percent by weight of NaOH and 0.5 percent by weight of $SiO_2$ (as sodium silicate) are then metered in slowly at a rate which is such that the pH value of 2.2 is maintained. The coating process is discontinued after the yellow interference color desired has been reached, and the pigment is filtered off, washed with water, dried and calcined for 30 minutes at 850° C.

The preparation displays a strong golden luster and powder color. Pigments incorporated in PVC show no color change whatsoever after 24 hours' exposure in a photo-activity test while a comparative preparation, which contains only $Fe_2O_3$, but not the combination according to the invention of $Fe_2O_3$ and $SiO_2$ in the $TiO_2$ layer, shows marked changes.

EXAMPLES 2

A suspension of 45 g of potassium mica having a platelet size between 10 and 70 μm in 1.5 l of water is adjusted to a pH value of 2.3 by means of a 10 percent $TiCl_4$ solution, and heated to 75° C. Both a solution containing 10 percent by weight of $TiCl_4$, 1 percent by weight of $FeCl_3$ and 0.75 percent by weight of $AlCl_3$ and a solution containing 10 percent by weight of NaOH and 0.38 percent by weight of $SiO_2$ (as sodium silicate) are then metered in slowly at a rate which is such that the pH value is maintained between 2.1 and 2.3. After the desired yellow interference color has been reached, the coating process is discontinued, and the pigment is filtered off, washed, dried at 110° C. and calcined for 30 minutes at 800° C.

The pigment displays a strong golden luster and powder color. Pigments incorporated in PVC show no color change whatsoever after 24 hours' exposure in a photo-activity test, while a comparative preparation, which contains only $Fe_2O_3$, but not the combination according to this invention of $Fe_2O_3$ and $SiO_2$ in the $TiO_2$ layer, shows marked changes.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Nacreous pigments having improved light fastness, consisting essentially of mica flakes whose surfaces are coated with a metal oxide layer, wherein the metal oxide layer comprises a homogeneous mixture of titanium dioxide, silicon dioxide and iron oxide containing about 0.1 to about 20 percent by weight of silicon dioxide and about 0.1 to about 60 percent by weight of iron oxide.

2. Nacreous pigments of claim 1 wherein the metal oxide layer additionally comprises $Al_2O_3$ in an amount of about 0.1 to about 20 percent by weight.

3. A nacreous pigment of claim 1 wherein the mica platelets have a diameter of about 5–200 μm.

4. A nacreous pigment of claim 1 wherein the amount of $Fe_2O_3$ in the metal oxide layer is 1–30 percent by weight and the amount of $SiO_2$ in the metal oxide layer is 1–10 percent by weight.

5. A nacreous pigment of claim 4 wherein the metal oxide layer further comprises 1–10 percent by weight of $Al_2O_3$.

6. A nacreous pigment of claim 1 wherein the total amount of $Fe_2O_3$ and $SiO_2$ in the metal oxide layer is 0.2–70 wt%.

7. A nacreous pigment of claim 1 wherein the total amount of $Fe_2O_3$ and $SiO_2$ in the metal oxide layer is 2–40 wt.%.

8. A process for preparing nacreous pigments having improved light fastness and comprising mica flakes whose surfaces are coated with a metal oxide layer, wherein the metal oxide layer comprises a homogeneous mixture of titanium dioxide, silicon dioxide and iron oxide containing about 0.1 to about 20 percent by weight of silicon dioxide and about 0.1 to about 60 percent by weight of iron oxide, consisting essentially of coating mica flakes in an aqueous suspension by uniformly coprecipitating thereon titanium dioxide hydrate, iron hydroxide and silicon dioxide to form a uniform layer homogeneously containing said precipitated components, and then washing, drying and calcinating the coated mica flakes, wherein the uniform coprecipitation of the titanium dioxide, iron hydroxide and silicon dioxide is achieved by suspending mica platelets in an aqueous solution of a pH of about 0.5–5, heating the solution to about 50°–100° C., adding a soluble titanium salt thereto and maintaining the solution pH substantially constant, and simultaneously adding $SiO_2$ to the solution in the form of a soluble silicate salt, these additions being effected in the presence of iron ions in the solution.

9. A process of claim 8 wherein the total amount of iron and silicon coprecipitated is about 0.2 to about 70 percent by weight of the metal oxide layer, calculated as $Fe_2O_3$ and $SiO_2$ present after the calcination.

10. A process of claim 9 wherein aluminum ions are present in the solution whereby aluminum hydroxide is additionally coprecipitated onto the mica flakes in an amount of about 0.1 to about 20 percent by weight, calculated as $Al_2O_3$ after calcination.

11. A process of claim 8 comprising simultaneously flowing a first solution comprising about 1 to about 40 percent by weight of $TiCl_4$ and about 0.02 to about 30 percent by weight of $FeCl_3$, and a second solution comprising about 0.01 to about 10 percent by weight of silicate, calculated as $SiO_2$, into a aqueous mica suspension whose pH is maintained at an essentially constant value; terminating the flowing step and the coating process after a desired interference color has been reached, and separating, washing, drying and calcining the resultant coated mica flakes.

12. A process of claim 11 wherein the first solution, in addition to $TiCl_4$ and $FeCl_3$, also comprises about 0.1 to about 15 percent by weight of $AlCl_3$.

13. In a composition comprising a base ingredient and a pearlescent pigment based on $TiO_2$ coated mica flakes, the improvement wherein the mica flakes are coated with a metal oxide layer, wherein the metal oxide layer comprises a homogeneous mixture of titanium dioxide, silicon dioxide and iron oxide containing about 0.1 to about 20 percent by weight of silicon dioxide and about 0.1 to about 60 percent by weight of iron oxide.

14. A composition of claim 13 which has been exposed to outdoor weather conditions in use.

15. A composition of claim 13 wherein the base ingredient is a plastic, lacquer, paint or toiletry formulation.

* * * * *